July 11, 1950      F. VON SCHLEGELL      2,514,614
TRACTOR HITCH
Filed July 28, 1947      2 Sheets-Sheet 1
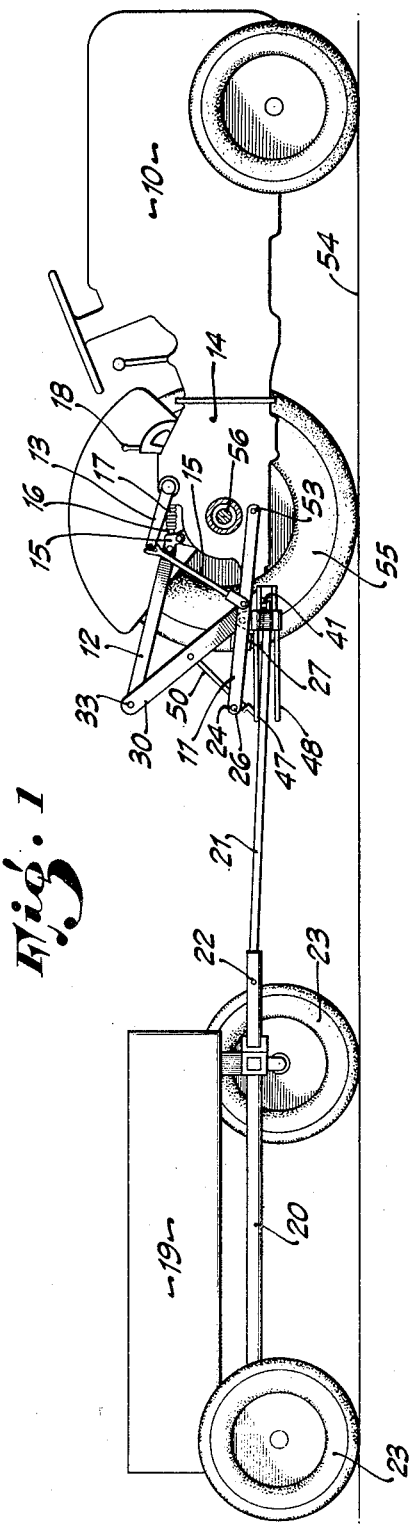
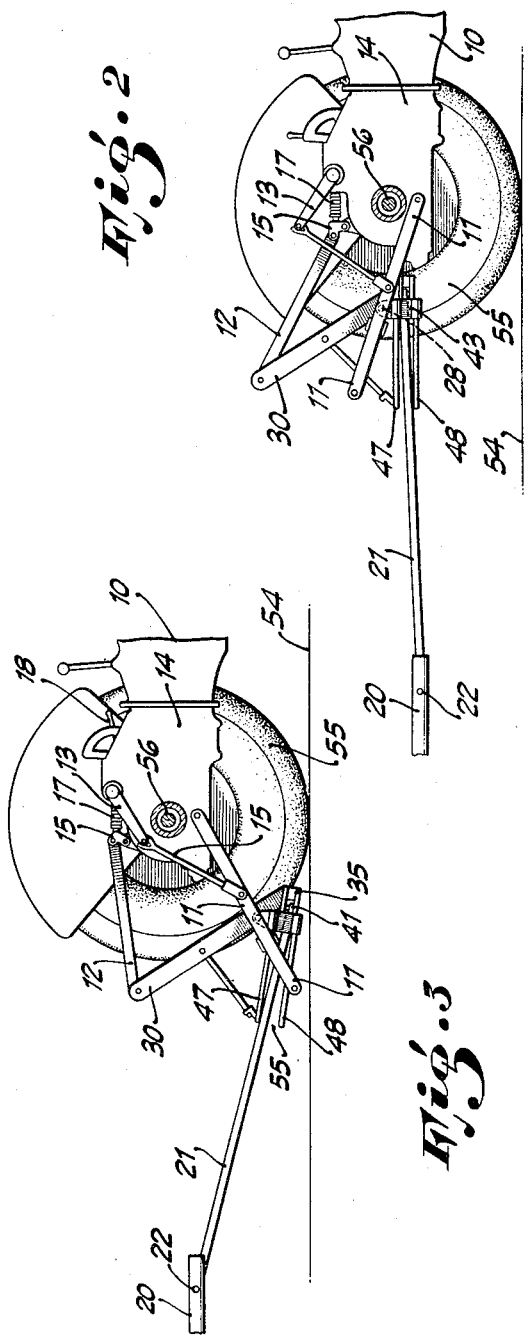
INVENTOR.
Frederick Von Schlegell,
BY
Lyon & Lyon
ATTORNEYS.

July 11, 1950    F. VON SCHLEGELL    2,514,614
TRACTOR HITCH
Filed July 28, 1947    2 Sheets-Sheet 2
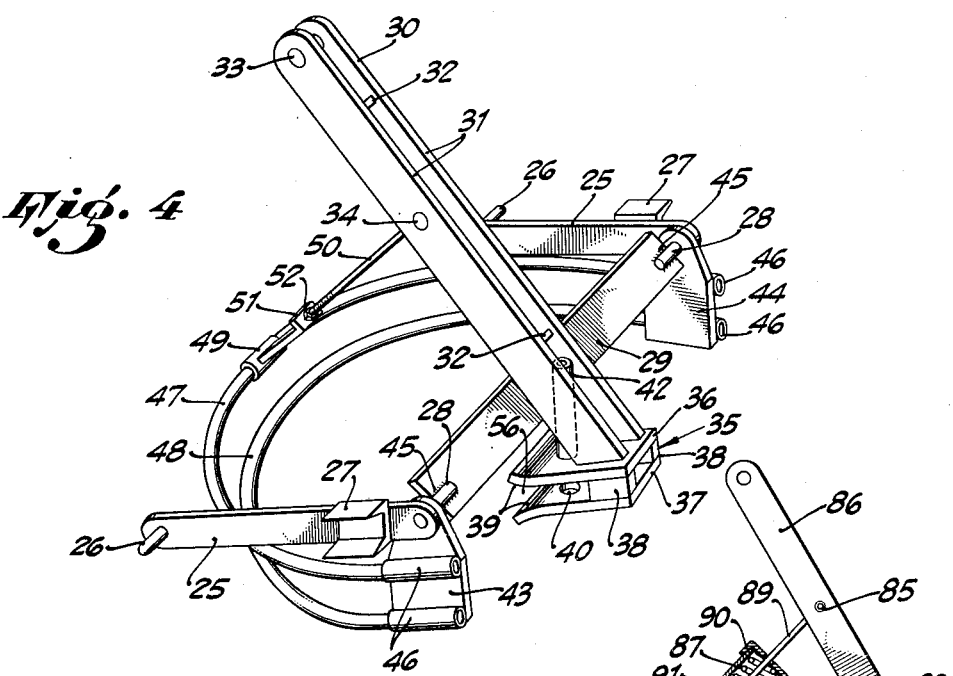
Fig. 4
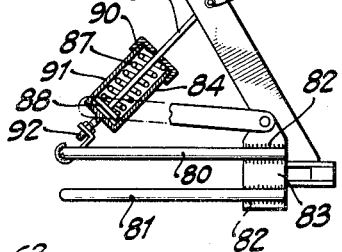
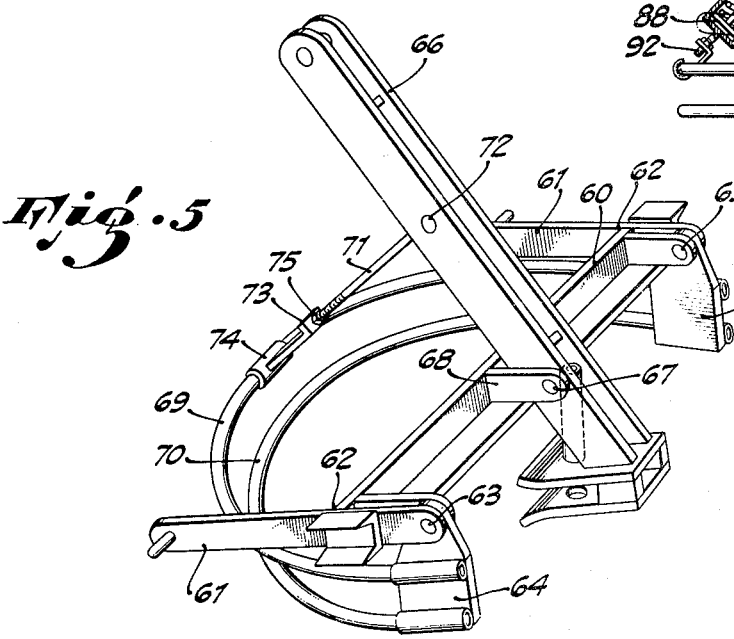
Fig. 5
Fig. 6
INVENTOR.
Frederick Von Schlegell,
BY Lyon & Lyon ATTORNEYS.

Patented July 11, 1950

2,514,614

UNITED STATES PATENT OFFICE 2,514,614

TRACTOR HITCH

Frederick von Schlegell, Los Angeles, Calif.

Application July 28, 1947, Serial No. 764,119

21 Claims. (Cl. 280—33.44)

This invention relates to releasable coupling devices and is particularly directed to an improved form of tractor hitch for use in connecting a towed vehicle, such as a trailer, to a tractor. This device finds particular usefulness in conjunction with implement raising or controlling means now commonly provided on tractors for drawing agricultural implements.

Conventional tractors now in use may include controls for automatically regulating the depth of cut or action of an agricultural implement drawn by the tractor and for increasing the traction of the tractor wheels in response to force resulting from the action of the implement. Such automatic controls have been successfully operated in conjunction with plows and other earth working implements in which a tendency to dig downwardly is present, but have given rather poor results when employed with drawn implements, trailers or vehicles whose principal resistance to forward motion appears as horizontal tension in the tongue of the device.

In my prior patent, 2,247,534 of July 1, 1941, I have disclosed a tractor hitch for tractors of the type described for operating harrows and other drawn implements. The present invention relates to an improvement over the structure disclosed in that patent and is more particularly concerned with providing a tractor hitch suitable for towing an implement or a vehicle. The implement may be of any type and may comprise, for example, a disk harrow, while the vehicle may be provided with wheels or skids. A towed vehicle or implement is referred to generically hereafter as a "trailer."

The principal object of this invention is to provide an improved form of tractor hitch. Another object is to provide a hitch of this type employing novel structure for transferring a portion of the weight of the trailer to augment the tractive ability of the tractor in response to tension in the tongue of the trailer. Another object is to provide a coupling device for a tractor provided with spaced draft links and having automatic control means for raising the links.

Another object is to provide an improved form of tractor hitch of this type which is effective in preventing overturning of the tractor about its rear wheels. Another object is to provide a releasable connection device for connecting a trailer tongue to a tractor, which device may be lowered to a position adjacent the ground level to facilitate engagement with the forward end of the tongue. A related object is to provide a device of this type employing spaced semi-circular resilient contact elements which are adapted to receive the tongue of the trailer and remain effective throughout a wide angular horizontal range of pivotal motion between the tongue and the tractor, as well as to allow the tractor and trailer to proceed over uneven ground and allow for limited relative vertical movement between the tractor and trailer. Other more detailed objects include the provision of a tractor hitch of this type employing semi-circular or arcuate elements above and below the tongue to the rear of its releasable connection to the tractor, the use of spring wire for said semi-circular elements to lend resiliency to the construction, or the use of nonresilient elements in connection with a tension spring to produce the same effect. These and other objects and features of this invention will be more fully understood from the following detailed description of preferred embodiments of this invention taken in connection with the accompanying drawings in which:

Figure 1 is a side elevation partly in section showing a tractor hitch embodying my invention and employed to connect a trailer with a tractor having rearwardly extending draft links and automatic control means for raising the links.

Figure 2 is a side elevation partly in section and partly broken away showing the coupling device of Figure 1 with the parts in position corresponding to presence of a relatively heavy draft load tension in the tongue of the trailer.

Figure 3 is a partial side elevation partly in section showing position of the parts when the coupling device is lowered to a position near the ground level for facilitating engagement with the forward end of the trailer tongue.

Figure 4 is a perspective view showing a preferred form of coupling device embodying my invention ready for installation on a conventional form of tractor provided with spaced draft links and automatic control means for raising the links.

Figure 5 shows a modified form of the device.

Figure 6 illustrates a further modification.

Referring to the drawings, the tractor 10 may be of any suitable or desirable type but is preferably of a construction employing the automatic implement control disclosed in the H. G. Ferguson Patents Nos. 1,687,719, 2,118,180, and 2,118,181. The essential features of such automatic control include a pair of transversely spaced rearwardly extending draft links 11 and a centrally positioned control bar 12 thereabove also extending rearwardly from the tractor. A pair of crank arms 13 extending transversely from the case 14 and each is adapted to operate one of the links 11 by means of the connecting elements 15. Hydraulic means (not shown) provided within the case 14 to serve to cause the cranks 13 to lift the links 11 whenever the bar 12 is moved forwardly relative to the case 14. Such motion of the bar 12 acts on the bell cranks 15 to move the rod 16 forwardly against the action of the return spring 17. The normal free height of the links 11 may be regulated by means of the control lever 18.

The trailer generally designated 19 may be of any suitable or desirable type and may include a frame 20 and a draft tongue 21 pivotally connected thereto at 22. Skids or wheels 23 may be provided if desired. The trailer 19, as well as the tractor 10, may be of a conventional design and forms no part of my present invention.

Each of the draft links 11 is provided with an aperture 24 adjacent its outer end. The coupling device embodying my invention and of the form shown in Figure 4 may include a pair of side bars 25, each having an outwardly projecting pin 26 adapted to project into the aperture 24. U-shaped clips 27 are secured on the side bars 25 and are each adapted to receive a portion of one of the draft links 11. It will be understood from this description that the pins 26 and clips 27 cooperate to mount the side bars 25 on the links 11. Pivotally attached to the side bars 25 by means of the pivot pins 28 is a pivotal support bar 29 adapted to extending transversely of the links 11. An inclined lever generally designated 30 is secured centrally to the bar 29 and is thus adapted to have pivotal motion about the side bars 25 and links 11. The lever 30 may include a pair of parallel straps 31 united in spaced relationship by the spacers 32 and the carrying transverse pins 33 and 34. The lower ends of the straps 31 extend beyond the bar 29 and support a draft fitting generally designated 35 which includes upper and lower plates 36 and 37 separated by spacers 38. The rearwardly projecting ends of the plates 36 and 37 are flared as shown in 39 to facilitate the entry of the forward end of the tongue 21 on the trailer 19. Aligned openings 40 are provided in the plates 36 and 37 for reception of the draft pin 41. A vertically extending guide tube 42 may be provided between the straps 31 if desired for facilitating the entry of the draft pin 41.

A pair of supporting members 43 and 44 are provided at opposite ends of the transverse bar 29 and are pivotally mounted on the pins 28 and 29, the latter pins being secured to the bar 29 as shown at 45. Each of the supporting members 43 and 44 may be provided with a pair of vertically spaced tubular sockets 46, each adapted to receive one of a pair of semi-circular contact elements 47 and 48. These contact elements extend rearwardly and generally horizontally and extend in an arc about the draft pin openings 40 as a center. These contact elements 47 and 48 are preferably formed of resilient material such as, for example, spring wire. The purpose of the sockets 46 is to provide suitable means for anchoring the elements 47 and 48 to the members 43 and 44 and it may be undesirable to weld the spring wire material directly to the members 33 and 34, for metallurgical reasons.

Means are provided for adjusting the angular position of the lever 30 with respect to the contact elements 47 and 48 and for insuring that the lever 30 and members 43 and 44 and contact elements 47 and 48 pivot in unison about the links 11, and as shown in the drawings this means includes a fitting 49 attached to the upper contact element 47. A bolt 50 connected to the transverse pin 34 passes through an unthreaded aperture in the flange 51 of the fitting 49. The projecting end of the bolt 50 is threaded and nuts 52 on each side of the flange 51 serve to adjustably secure the bolt 50 to the fitting 49 as will be readily understood.

In the operation of that form of my invention illustrated in Figure 4, a coupling device is installed on the tractor by inserting the draft links 11 in place within the U-shaped members 27 and by inserting the pins 26 into the apertures 24. The control bar 12 is attached to the upper end of the lever 30 by means of the pivot pin 33. The nuts 52 are then adjusted relative to the bolt 50 to bring the contact elements 47 and 48 into a horizontal position when they are lifted to the desired elevation. The coupling device may then be raised and lowered relative to the tractor by operation of the control lever 18. This lever 18 controls the action of the hydraulic means (not shown) within the case 14 for operating the cranks 13 and thus raising and lowering the draft links 11. It will be observed that the proportionate lengths of the links 11, lever 30, control bar 12 and the locations of the pivotal supports 53 for the links 11, is such that approximate parallelism is maintained between the links 11 and the control bar 12 within the normal limits of operation. Accordingly, the angular position of the inclined lever 30 does not change materially during a normal range of vertical movement and since the contact elements 47 and 48 are nonrotatably secured to the lever 30 they remain substantially horizontal.

When it is desired to connect the tongue 21 to the tractor 10, the coupling device is lowered to a position as illustrated in Figure 3 and the tractor is backed and maneuvered to bring the draft fitting 35 adjacent the forward end of the tongue 21 which may be resting on the ground surface 54. The tongue 29 may be lifted only slightly to rest the forward end on the lower element 48. The control lever 18 is actuated to lift the links 11 and coupling device to a position in which the tongue is substantially horizontal. The tractor is then backed sufficiently to bring the draft fitting 35 to the proper spaced position with respect to the trailer 19. The tongue 21 may be moved laterally to bring the forward end of the tongue into the draft fitting 35 and the draft pin 41 may then be inserted to form a pivotal connection between the fitting 35 and the tongue 21.

In the event that the trailer 19 should be heavily loaded or that soft ground should impede forward motion of the trailer, or if an agricultural implement should encounter a difficult stretch of ground, and thus produce a relatively high tension force in the tongue 21, the lower end of the lever 30 moves rearwardly under such tension force, pivoting about the pins 28 and imposing a compression force in the control bar 12. As explained above such action affects the automatic control means on the tractor to raise the links 11. The raising of the lings 11 necessarily raises the supporting members 43 and 44 which are connected thereto and raises the contact element 48 into engagement with the under side of the tongue 21. The tongue then acts as a beam with an upward force applied between its ends and a lifting force is thus transmitted to the trailer frame 20 through the pivotal connection 22. The upward force thus transmitted to the tongue 21 imposes a corresponding downward force on the rear portion of the tractor with the result that the load on the rear wheels 55 of the tractor is increased. In other words, a portion of the load or weight of the trailer 19 is transferred to the tractor 10 and the tractive ability is thereby increased. This feature is a particularly desirable one since it enables the use of a relatively light tractor to tow heavily loaded trailers. In the event that forward motion of the trailer should be partially arrested, the weight of the trailer becomes effective to increase the traction and avoids slipping of the traction wheels 55.

While I have described the tractor 10 as being of the type which includes automatic means for raising the links 11 in response to thrust of the bar 12, it is to be understood that my coupling device is not limited to use with tractors provided with such automatic control. All that is required is some form of lifting means on the tractor which may be operated manually or by power for raising the links 11, but it is not essential that the control bar 12 actuate such lifting means. When this latter construction is employed the lifting means may be actuated to lift the links 11 to the desired position and to hold them there.

If additional weight on the tractor wheels 55 is required, the operator causes the lifting means to lift the links 11 and hence engage the lower element 48 under the tongue 21 to transfer part of the trailer weight to the tractor. During normal operation and when passing over uneven ground the resilient connection afforded by the spring elements 47 and 48 allows relative vertical movement between the tractor and trailer within limits without any tendency to lift the forward end of the tractor off the ground.

Some tractors have exhibited the dangerous and well known tendency to overturn when climbing a hill, the torque on the rear wheels 55 serving to lift the forward portion of the tractor off the ground. In order to prevent this action, I prefer to provide the upper contact member 47 which overlies a portion of the tongue at a location to the rear of the draft pin 41. As shown in Figure 1 the contact element 47 may rest on the upper surface of the tongue and thus utilize the stiffness of the tongue as a beam to prevent overturning movement of the tractor, in which the forward portion of the tractor would tend to climb over the supporting axle 56 of the rear wheels 55.

A further advantageous feature of the coupling device embodying my invention is that it may be close coupled with respect to the tractor and lie substantially between the standard draft links 11 rather than disposed to the rear thereof. This advantageous result is accomplished by means of the arms 25 which shift the location of the pivotal support for the lever 30 from the apertures 24 provided in the links 11 to the position of the pins 28.

In the modified form of my invention illustrated in Figure 5, the cross bar 60 is secured to the side bars 61 by any convenient means such as, for example, by welding at 62. The pins 63 serve to pivotally connect the supporting members 64 and 65 to the cross bar 60 and to the side bar 61. In this form of my device, therefore, the cross bar 60 does not pivot with the lever 66 but, on the contrary, operates in unison with the draft links 11. Pivotal movement between the lever 66 and the cross bar 60 is provided by the pivot pin 67 carried on forwardly extending ears 68 positioned centrally of the cross bar 60.

Means are provided for adjustably securing the contact elements 69 and 70 for unitary movement with the lever 66, and as shown in Figure 5 this means includes the bolt 71 pivotally attached to the lever 66 at 72 and extending through an aperture in the flange 73 of the fitting 74. Nuts 75 adjustably secure the bolt relative to the flange 73. It will be understood from this description that pivotal movement of the lever 66 causes similar movement of the contact elements 69 and 70, pivoting about the pin 63. The pins 63 and 67 are preferably mounted in co-axial relationship. In operation this form of my invention functions in substantially the same manner as that previously described. In Figure 6 I have illustrated a further modification in which the contact elements 80 and 81 are formed in the same shape as those previously described but which are not made of resilient material. These elements may be constructed of ordinary low carbon steel bar if desired and welded at 82 in spaced relationship to the supporting members 83. In order to provide the desirable resilient action, the bolt 50 or 71 may be replaced by the spring unit 84 which connects the upper semi-circular contact element 80 with the pivot 85 on the lever 86. A compression spring 87 acts at one end against the flange 88 on the lower end of the rod 89 extending from the pivot 85. The other end of the compression spring 87 bears against the cap 90 on the container 91 which is secured to the rod 92 for attachment to the element 80. The operation of this device is essentially the same as that previously described for the forms of my invention illustrated in Figures 4 and 5.

In each of the forms of the coupling device described herein limited relative movement in the direction of the draft pull is provided for and between the trailer tongue and the tractor. This limited relative longitudinal movement occurs upon pivotal movement of the lever in actuating the control bar 12. It will therefore be understood that the action of the coupling device in transferring part of the weight of the trailer to the tractor occurs in response to relative movement of the tractor and trailer in the direction of the draft pull.

Having fully described my invention, it is to be understood that I do not wish to be limited to the detail herein set forth but my invention is of the full scope of the appended claims.

I claim:

1. A coupling device for connecting a trailer tongue to a tractor, comprising in combination: a lever pivotally supported on the tractor for movement about a substantially horizontal transverse axis, means on the lever below said axis for releasably attaching thereto the forward end of a trailer tongue, means on the lever above said axis for attachment to a yieldable element on the tractor, and an element non-rotatably secured to the lever and extending under a portion of the tongue to the rear of its forward end, said element applying a lifting force to the tongue upon movement of the lever relative to the tractor.

2. A coupling device for connecting a trailer tongue to a tractor, comprising in combination: transversely spaced supporting members adapted to be carried on the tractor, a lever extending upwardly between said members, fulcrum means for pivotally supporting the members and the lever for movement relative to the tractor about a substantially horizontal transverse axis, means on the lever at a point spaced from said axis for releasably attaching thereto the forward end of a trailer tongue, an element non-rotatably secured relative to the lever and extending to engage under a portion of the tongue to the rear of its forward end and thereby applying a lifting force to the tongue upon movement of the lever relative to the tractor, and means on said lever at another point spaced from said axis for connection with the tractor.

3. A coupling device for connecting a trailer tongue to a tractor provided with draft links and a control element for lifting the links, comprising in combination: a lever extending upwardly between said links, means for pivotally supporting the lever for movement about a substantially horizontal transverse axis, means on the lever at a point spaced from said axis for releasably attaching thereto the forward end of a trailer tongue, an element non-rotatably secured relative to the lever and extending to engage under a portion of the tongue to the rear of its forward end and thereby apply a lifting force to the tongue upon upward movement of the links, and means for connecting the tractor control element to said lever at another point spaced from said horizontal axis.

4. A coupling device for connecting a trailer tongue to a tractor provided with draft links and a control element for lifting the links, comprising in combination: a lever extending upwardly at a central position between said links, means for pivotally supporting the lever relative to the links for movement about a substantially horizontal transverse axis, means on the lever below said axis for releasably attaching thereto the forward end of a trailer tongue, a resilient element non-rotatably secured relative to the lever and extending under a portion of the tongue to the rear of its forward end and thereby apply a lifting force to the tongue upon upward movement of the links, and means for connecting the tractor control element to said lever at a point above said horizontal axis.

5. A coupling device for connecting a trailer tongue to a tractor provided with draft links and a control element for lifting the links, comprising in combination: transversely spaced supporting members adapted to be carried on the draft links of the tractor, a lever extending upwardly between said members, means on the links for pivotally supporting the members and the lever for unitary movement about a substantially horizontal transverse axis, means on the lever below said axis for releasably attaching thereto the forward end of a trailer tongue, a semi-circular element secured at its ends to said members and extending in an arc under a portion of the tongue rearwardly from its forward end and thereby apply a lifting force to the tongue upon upward movement of the links, and means for connecting the tractor control element to said lever at a point above said horizontal axis.

6. In combination, a tractor having a pair of transversely spaced rearwardly extending draft links, power means on the tractor for raising said links, a control bar for actuating the power means, an upwardly extending lever positioned between said draft links, fulcrum means for supporting said lever on said draft links for pivotal movement about a substantially horizontal axis, a trailer having a tongue, means for releasably connecting the forward end of the tongue to said lever at a location spaced from said axis, means operatively connecting the control bar to said lever at another location spaced from said axis, and an element secured to said lever and extending rearwardly under said tongue, whereby draft tension in said tongue may raise the element into contact with the tongue to transfer a portion of the weight of the trailer to said tractor.

7. In combination, a tractor having a pair of transversely spaced rearwardly extending draft links, power means on the tractor for raising said links, a control bar for actuating the power means, an upwardly extending lever positioned centrally of said tractor between said draft links, fulcrum means for supporting said lever on said draft links for pivotal movement about a substantially horizontal axis, a trailer having a tongue, means for releasably connecting the forward end of the tongue to said lever at a location below said axis, means operatively connecting the control bar to said lever at a location above said axis, and a resilient element secured to said lever and extending rearwardly in an arc under said tongue, whereby draft tension in said tongue may raise the resilient element into contact with the tongue to transfer a portion of the weight of the trailer to said tractor.

8. In combination, a tractor having a pair of transversely spaced rearwardly extending draft links, power means on the tractor for raising said links, a control bar for actuating the power means, a supporting member carried on each draft link, an upwardly extending lever positioned centrally of said tractor between said draft links, fulcrum means on said members for supporting said lever, and said members on said draft links for unitary pivotal movement about a substantially horizontal axis, a trailer having a tongue, means including a draft pin for releasably connecting the forward end of the tongue to said lever at a location below said axis, means operatively connecting the control bar to said lever at a location above said axis, and a resilient element secured at its ends to said supporting members and extending rearwardly under said tongue, whereby draft tension in said tongue may raise the resilient element into contact with the tongue to transfer a portion of the weight of the trailer to said tractor.

9. In combination, a tractor having a pair of transversely spaced rearwardly extending draft links, power means on the tractor for raising said links, a control bar for actuating the power means, a supporting member detachably carried on each draft link, an upwardly extending lever positioned centrally of said tractor between said draft links, fulcrum means on said members for supporting said lever, and said members on said draft links for pivotal movement about a substantially horizontal axis, adjustable means for angularly positioning the lever with respect to said members and for preventing relative pivotal movement therebetween, a trailer having a tongue, means including a draft pin for releasably connecting the forward end of the tongue to said lever at a location below said axis, means operatively connecting the control bar to said lever at a location above said axis, and a resilient element secured at its ends to said supporting members and extending rearwardly in an approximate semi-circle about said draft pin as center, said element extending under said tongue, whereby draft tension in said tongue may raise the resilient element into contact with the tongue to transfer a portion of the weight of the trailer to said tractor.

10. Apparatus for coupling a ground supported trailer to a tractor having vertically movable draft means, the apparatus including a part secured to said draft means to move therewith, and means for coupling the trailer to said part comprising a lever pivotally connected with the trailer tongue and pivotally connected with said part, and a resilient contact element associated with the lever and adapted to engage under a portion of the trailer tongue to resist relative pivotal movement of said draft means and lever in one direction.

11. A device for coupling a ground supported trailer having a tongue with vertically movable draft links provided on a tractor, the device including a lever pivotally carried on the links, pivotal means connecting the lever with an element on the tractor adapted to maintain the angular position of the lever substantially constant with respect to the tractor during normal movement of the links, means for connecting the trailer tongue with the lower portion of the lever, and a horizontal resilient element secured relative to the lever and extending rearwardly therefrom beneath the draft tongue, and adapted to apply a lifting force thereto upon upward movement of the draft links.

12. A device for coupling the tongue of a trailer to a tractor having rearwardly extending draft links, the device including a lever pivotally mounted on the links and arranged to pivot about an axis spaced between its upper and lower ends and to be moved vertically by the links, a member pivotally connecting the tractor to the lever at a point above said axis, means for coupling the trailer tongue with the lever at a point below said axis and below the level of attachment of the links to the tractor, whereby the draft pull tends to raise the lever, and a rearwardly projecting contact element on the lower portion of the lever adapted to underlie the tongue and to exert a raising force thereon upon upward movement of the lever.

13. A device for coupling the tongue of a trailer to a tractor having rearwardly extending draft links, the device including a lever pivotally mounted on the links and arranged to pivot about an axis spaced between its upper and lower ends and to be moved vertically by the links, a member pivotally connecting the tractor to the lever at a point above said axis, means for coupling the trailer tongue with the lever at a point below said axis and below the level of attachment of the links to the tractor, whereby the draft pull tends to raise the lever, and a pair of rearwardly extending resilient contact elements non-rotatably secured relative to the lever and adapted to receive the tongue therebetween, the lower of said elements acting to impose an upward force on the tongue upon upward movement of the draft links.

14. In a coupling device for connecting a trailer tongue to a tractor provided with vertically movable draft links, the combination of a lever pivotally carried on said links, draft means for connecting the trailer tongue to the lower end of the lever, means operatively connecting the lever with an element on the tractor adapted to maintain substantially constant the angular position of the lever with respect to the tractor during normal movement of the links, a pair of substantially horizontal rearwardly extending arcuate contact elements non-rotatably secured relative to the lever and adapted to receive the trailer tongue therebetween, the lower of said elements acting to impose an upward force on the tongue upon upward movement of the draft links.

15. In a coupling device for connecting a trailer tongue to a tractor provided with vertically movable draft links, the combination of a lever pivotally carried on said links, draft means for connecting the trailer tongue to the lower end of the lever, means operatively connecting the lever with an element on the tractor adapted to maintain substantially constant the angular position of the lever with respect to the tractor during normal movement of the links, a pair of substantially horizontal rearwardly extending vertically spaced contact elements connected to said lever and adapted to receive the trailer tongue therebetween, the lower of said elements acting to impose an upward force on the tongue upon upward movement of the draft links, and means for adjusting the angular position of said contact elements relative to said lever.

16. In combination, a tractor having a pair of transversely spaced rearwardly extending draft links pivotally mounted thereon, means on the tractor for raising said links, a lever pivotally supported on said links, draft means at the lower end of the lever whereby the forward end of a trailer tongue may be releasably connected thereto, a rearwardly extending contact element non-rotatably secured relative to the lever and adapted to engage the underside of the tongue at a location to the rear of said draft means, and means operatively associated with the tractor and lever adapted to substantially prevent angular movement of the contact element during pivotal movement of the draft links.

17. In combination, a tractor having a pair of transversely spaced rearwardly extending draft links pivotally mounted thereon, means on the tractor for raising said links, a lever pivotally supported on said links, draft means at the lower end of the lever whereby the forward end of a trailer tongue may be releasably connected thereto, a pair of rearwardly extending resilient contact elements non-rotatably secured relative to said lever and adapted to receive the tongue therebetween, the lower of said elements acting to impose an upward force on the tongue upon upward movement of the draft links, and means operatively associated with the tractor and lever adapted to substantially prevent angular movement of the contact element during pivotal movement of the draft links.

18. A coupling device for connecting a trailer tongue to a tractor, comprising in combination: a lever pivotally supported on the tractor for movement about a substantially horizontal transverse axis, means on the lever below said axis for releasably attaching thereto the forward end of a trailer tongue, a resilient semi-circular element secured relative to the lower portion of the lever and symmetrically therewith, said element extending rearwardly and adapted to underlie a portion of the tongue, and to apply a lifting force to the tongue as a consequence of movement of the lever relative to the tractor.

19. A coupling device for connecting a trailer tongue to a tractor, comprising in combination: a lever pivotally supported on the tractor for movement about a substantially horizontal transverse axis, means on the lever below said axis for releasably attaching thereto the forward end of a trailer tongue, a pair of resilient semi-circular elements disposed in parallel planes and defining a gap therebetween for reception of said tongue, said elements being secured relative to the lower end of said lever and extending symmetrically and rearwardly therefrom, the lower of said elements acting to apply lifting force to the tongue upon movement of the lever relative to the tractor.

20. A coupling device for connecting a trailer tongue to a tractor, comprising in combination: a lever pivotally supported on the tractor for movement about a substantially horizontal transverse axis, means on the lever below said axis for releasably attaching thereto the forward end of a trailer tongue, an element pivotally secured to the lower portion of the lever and extending rearwardly to a position below a portion of the tongue, the element acting to apply a lifting force to the tongue upon movement of the lever relative to the tractor, and means including a spring adapted to resist relative pivotal movement of the lever and said element.

21. A coupling device for connecting the tongue of a trailer to a tractor, comprising in combination a lever pivotally supported on the tractor for movement about a substantially horizontal transverse axis; means on the lever below said axis for releasably attaching thereto the forward end of a trailer tongue; a resilient element on said lever extending rearwardly under a portion of the tongue so that upon movement of the lever in one direction with respect to the tractor a downward force is applied by the tongue to the coupling device.

FREDERICK von SCHLEGELL.

REFERENCES CITED

The following references are of record in the file of this patent:

UNITED STATES PATENTS

| Number | Name | Date |
|---|---|---|
| 2,321,516 | Robertson | June 8, 1943 |